(12) United States Patent
George et al.

(10) Patent No.: US 10,724,997 B2
(45) Date of Patent: Jul. 28, 2020

(54) SYSTEM COMBINING LASER ABLATION WITH ULTRASOUND INSPECTION OF PARTS

(71) Applicant: The Boeing Company, Chicago, IL (US)

(72) Inventors: Panagiotis Emanuel George, Lake Tapps, WA (US); Ashley C. Tracey, Seattle, WA (US); Hong Hue Tat, Redmond, WA (US)

(73) Assignee: The Boeing Company, Chicago, IL (US)

( * ) Notice: Subject to any disclaimer, the term of this patent is extended or adjusted under 35 U.S.C. 154(b) by 164 days.

(21) Appl. No.: 15/967,378

(22) Filed: Apr. 30, 2018

(65) Prior Publication Data
US 2019/0331646 A1   Oct. 31, 2019

(51) Int. Cl.
*G01N 29/24*   (2006.01)
*G01N 29/34*   (2006.01)
*G01N 21/71*   (2006.01)
*G01N 29/04*   (2006.01)
*B23K 26/36*   (2014.01)

(52) U.S. Cl.
CPC ......... *G01N 29/2418* (2013.01); *B23K 26/36* (2013.01); *G01N 29/04* (2013.01); *G01N 2291/0231* (2013.01); *G01N 2291/0234* (2013.01); *G01N 2291/0289* (2013.01); *G01N 2291/2694* (2013.01)

(58) Field of Classification Search
CPC .................................................. G01N 29/2418
See application file for complete search history.

(56) References Cited

U.S. PATENT DOCUMENTS

| 4,338,822 | A | * | 7/1982 | Yamaguchi | ........ | G01N 29/2418 |
| | | | | | | 73/643 |
| 8,332,165 | B1 | | 12/2012 | Tat et al. | | |
| 9,164,066 | B1 | | 10/2015 | Bossi et al. | | |
| 9,575,033 | B1 | | 2/2017 | Georgeson et al. | | |

(Continued)

OTHER PUBLICATIONS

Monchalin, Jean-Pierre et al., "Laser-Ultrasonics for Industrial Applications", In: Thompson D.O., Chimenti D. E. (eds) Review of Progress in Quantitative Nondestructive Evaluation, 1988, 8 pages.

(Continued)

*Primary Examiner* — Herbert K Roberts
(74) *Attorney, Agent, or Firm* — Kolisch Hartwell, P.C.

(57) ABSTRACT

A system and method combine ablation of a surface of a part with inspection of the internal integrity of the part. A laser may direct an ablative laser pulse at the surface of the part sufficient to remove a portion of material from the part surface and to cause the part to produce an ultrasound waveform. A positioning system may provide relative movement of the ablative laser pulse and the part for application of a series of ablative laser pulses at a series of locations over an area of the surface of the part. An ultrasonic detection device may couple to the part to receive the ultrasound waveform and transmit it to a part inspection system that has stored a set of reference waveforms in a control computer. The system compares the ultrasound waveform to one or more of the reference waveforms to detect and characterize anomalies in the part.

20 Claims, 7 Drawing Sheets

(56) References Cited

U.S. PATENT DOCUMENTS

| | | | |
|---|---|---|---|
| 9,625,423 B2 | 4/2017 | Bossi et al. | |
| 10,016,792 B2 | 7/2018 | Tracey et al. | |
| 10,363,586 B2 | 7/2019 | Barclay | |
| 2005/0120803 A1* | 6/2005 | Sokol | G01N 29/2412 73/801 |
| 2009/0010285 A1* | 1/2009 | Dubois | G01N 21/1702 372/3 |
| 2014/0116146 A1 | 5/2014 | Bossi et al. | |
| 2018/0290183 A1 | 10/2018 | Tracey et al. | |
| 2019/0126328 A1 | 5/2019 | Barclay et al. | |
| 2019/0275568 A1 | 9/2019 | Barclay | |

OTHER PUBLICATIONS

Beattie, Allan et al., "Emerging Nondestructive Inspection Methods for Aging Aircraft", U.S. Department of Transportation Federal Aviation Administration, Oct. 1994, pp. 1-176.

Hsu, David K. et al. "Applications of Electromagnetic Acoustic Transducers in the NDE of Non-Conducting composite Materials", KSME International Journal, Sep. 1999, vol. 13, No. 5, pp. 403-413.

Handbook-Airframe, Aviation Maintenance Technician, Chapter 07: Advanced Composite Material, vol. 2 FAA-H-8083-31, US Department of Transportation, Federal Aviation Administration, 2012, 58 pages.

Innerspec, EMAT Technology, Oct. 10, 2015, retrieved from internet: https://www.innerspec.com/knowledge/emat-technology/, retrieved on Apr. 17, 2018, 3 pages.

\* cited by examiner

SYSTEM COMBINING LASER ABLATION WITH ULTRASOUND INSPECTION OF PARTS

FIELD

This disclosure relates to systems and methods for laser preparation and testing of parts, such as composite structures for aircraft applications. More specifically, the disclosed embodiments relate to a system for laser cleaning and ablation of a surface of a part combined with ultrasonic inspection of the part.

INTRODUCTION

Laser energy may be applied to a part made from a composite material or a metal to ablate a portion of the part at a surface of the part. As an example of a part, an aerodynamic skin component for an aircraft may be formed of a composite material or a metal. The term "composite material" here refers to a material made of two or more constituent materials, for example carbon or other reinforcing fibers embedded in a polymer resin matrix. The portion of the part removed from the composite material may include surface contaminants, such as mold release agents, residues that result from ultraviolet (UV) exposure of the matrix material, a non-UV-exposed layer of the matrix material, and/or the fiber material in the composite. The portion of the part removed from a metal material may include an oxide layer and a portion of the metal material itself. The laser parameters, such as wavelength, power, energy, irradiance, and dosage may be selected to produce an energy absorption in the part for the particular processing desired for the part. For example, the laser may produce sufficient energy in the part to remove the contaminants and/or layers while leaving underlying material intact. The portion of the part may be removed in order to prepare the part for subsequent processing, such as application of paint or other coatings, for bonding, or to smooth, roughen, or otherwise change the surface morphology, or reduce the thickness of the part.

Processing of the part may also include inspection for any anomalies in the part, such as delaminations or internal voids, with nondestructive inspection techniques such as ultrasonic testing. Ultrasonic testing is performed by applying a nondestructive impulse to the part, such as a laser of sufficient energy to create a thermoelastic expansion of the material, which produces an ultrasound waveform. The ultrasound waveform at each of a series of locations over an area of the part may be compared to a baseline waveform for a known conforming part. If the part has an anomaly adjacent one or more locations, then ultrasound waveforms produced in such locations will differ from the baseline waveform, revealing the anomaly so the part can be rejected and/or subjected to further inspection to aid in the manufacturing process. Such inspection is carried out in separate testing from the ablative processing, requiring additional time and expense for completing the part preparation process.

SUMMARY

Embodiments of the present disclosure provide a system for combining laser ablation with ultrasound inspection. The present disclosure describes use of laser ablation for removal of material from a part and for producing, receiving, storing, inspecting, and comparing ultrasound waveforms to detect anomalies in the part. Benefits of this combining of ablation with ultrasound inspection may include elimination of a separate inspection process and of fixturing and other hardware associated with the separate inspection process.

In some embodiments, a system for preparing an area of a surface of a part formed of a composite material and for inspecting a structural integrity of the part may include a laser ablation system, a relative-positioning system for the part and the laser ablation system, an ultrasound testing system, and a processor. The laser ablation system may direct one or more ablative laser pulses at the surface of the part to remove a portion of the composite material adjacent to the surface of the part and to cause the part to produce an ultrasound waveform. The relative-positioning system may be coupled to one or both of the part and the laser ablation system to provide for adjusting the relative position of the part and the ablative laser pulse over a set of locations distributed across the area of the part. The ultrasound testing system may include a transducer to detect the ultrasound waveform produced by the part. The processor may be configured to receive the ultrasound waveform and to compare the ultrasound waveform at the location to a baseline waveform.

In some embodiments, a system for combined preparing of a surface of a composite structure and inspecting an internal integrity of the structure may include a fixture for holding the composite structure, a laser ablation system for directing an ablative laser pulse at the surface of the composite structure, a positioning system coupled to at least one of the laser ablation system and the fixture, an ultrasonic detection device for coupling to the composite structure to receive an ultrasound waveform produced by the ablative laser pulse, and a control computer coupled to the laser ablation system, the positioning system, and the ultrasonic detection device for directing a series of ablative laser pulses at a series of locations over the surface of the structure and receiving the ultrasound waveform from the structure after each pulse.

In some embodiments, a method for preparing an area of a surface of a part formed of a composite material and for inspecting a structural integrity of the part, may include the steps of:
 a. providing a laser ablation system for directing an ablative laser pulse at the surface of the part to remove a portion of the composite material from the surface of the part and to cause the part to produce an ultrasound waveform;
 b. providing a system for relative positioning of the part and the ablative laser pulse;
 c. providing an ultrasound testing system including a transducer to detect the ultrasound waveform produced by the part;
 d. positioning the part relative to the ablative laser pulse at a location in the area of the part;
 e. directing the pulse at the location in the area of the part;
 f. receiving in the ultrasound testing system the ultrasound waveform caused by the pulse;
 g. comparing the ultrasound waveform at the location to a baseline waveform;
 h. repeating, at a set of locations distributed across the area of the part, the steps of positioning the part relative to the ablative laser pulse, directing the pulse, receiving the ultrasound waveform, and comparing the ultrasound waveform.

Features, functions, and advantages may be achieved independently in various embodiments of the present disclosure, or may be combined in yet other embodiments, further details of which can be seen with reference to the following description and drawings.

DESCRIPTION

Various aspects and examples of a system combining laser ablation of a part with ultrasound inspection of the part are described below and illustrated in the associated drawings. Unless otherwise specified, a combined system and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Figure 1:
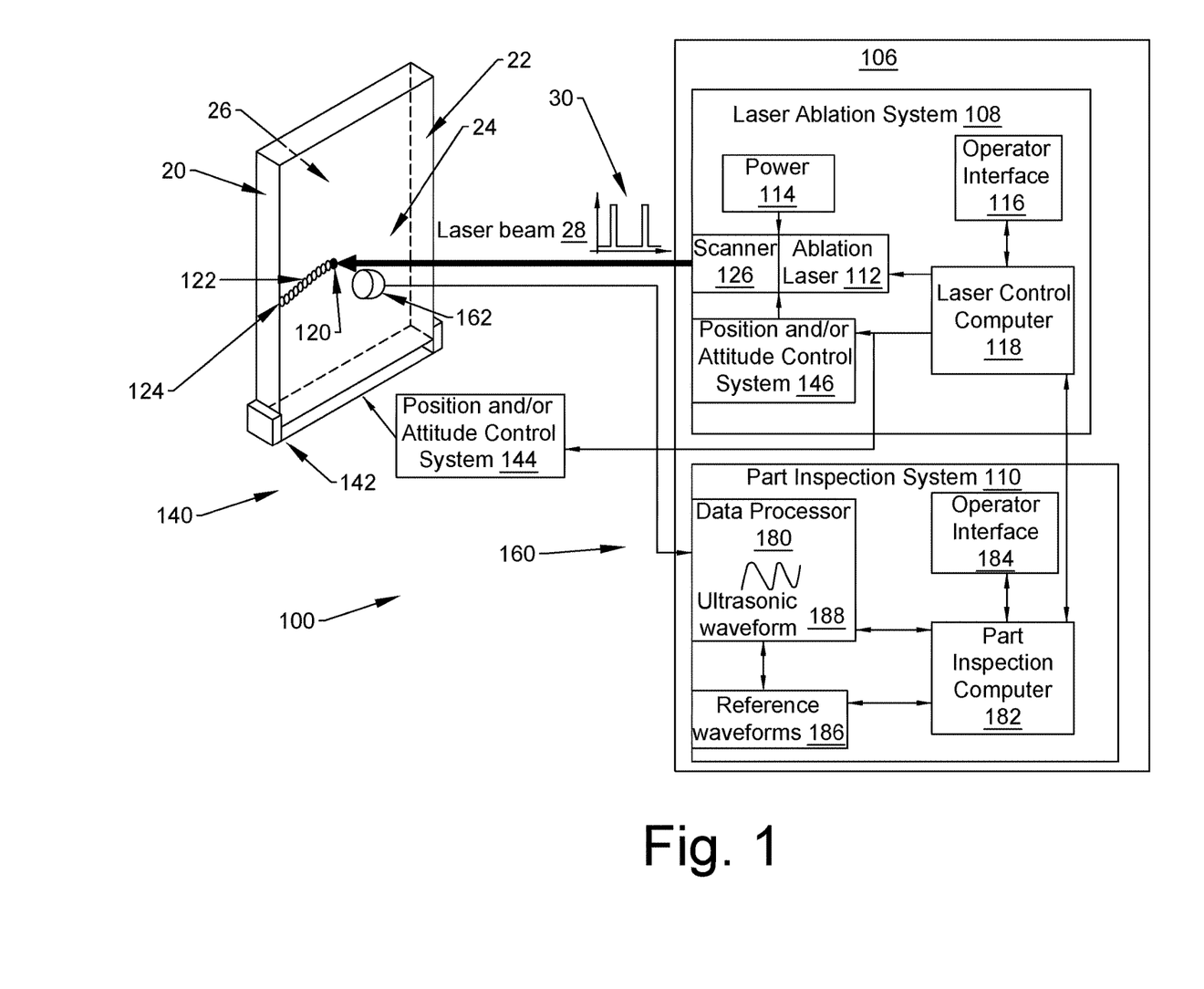
FIG. 1 is a block diagram of a system for laser ablation and part inspection operating on a reference part to develop a set of ultrasound waveforms for use as reference waveforms.

As shown in FIGS. 1-5, a system 100 in accordance with one or more embodiments of the present invention, may be used in the processing of parts made of composite material or metal. System 100 may be used to process reference parts to develop reference waveforms 186 as well as to process parts for production. System 100 will be described in detail for FIGS. 2-5. More briefly, for the processing of a reference part 20 as shown in FIG. 1, reference part 20 may have a first surface 22 and a second surface 26 opposite first surface 22. First surface 22 may include an area 24 where a laser beam 28 may be directed in pulses 30 to ablate material while a transducer 162 receives ultrasonic waveforms produced by laser pulses 30 and transmits the waveforms to a data processor 180 for storage as reference waveforms 186. In the example shown in FIG. 1, transducer 162 is directly coupled to first surface 22 of reference part 20, and it will be understood that other transducer configurations may be used for the characterization of reference parts, e.g., those shown in FIGS. 2-5.

As shown in FIGS. 2-5, a system 100 in accordance with one or more embodiments of the present disclosure may be used in processing a part, such as part under test 90. The part may include a first surface 102 that includes an area 104 that will be cleaned, ablated and/or otherwise prepared for subsequent processing and/or use. Area 104 may include substantially all of the first surface of the part or one or more subsets of the first surface as appropriate for the particular type of processing being carried out on the part.

System 100 may include a combined ablation and inspection system 106 with a laser ablation system 108 and a part inspection system 110. An ablation laser 112 may be provided in laser ablation system 108 with a power source 114 sufficient for ablation of the part. The type of laser and the power may be selected as suitable for the particular type of material for the part and the desired depth of removal of material. Laser ablation system 108 may also include an operator interface 116, or an automated interface, for setting parameters of the ablation laser via a laser control computer 118. Typically, ablation laser 112 will produce a pulsed laser beam 28 with parameters such as wavelength, power, energy, irradiance, and dosage of the pulses selected for the particular type of material of the part and the desired level of ablation.

The laser ablation system is thus capable of directing an ablative laser pulse at the surface of the part sufficient to remove a portion of the composite material adjacent to the surface of the part. The ablative laser pulse will also cause the part to produce an ultrasound waveform in response to the absorption of laser energy and ablation of material.

As shown in FIGS. 2-5, each ablative laser pulse causes ablation at a small area or point 120, and typically only a single pulse is applied at each point, although that may be varied for a given application. The target of the laser pulse may be changed between each pulse, typically to the next point along a path of ablation 122, and the re-targeting repeated to direct a series of laser pulses 30 along ablation path 122. Changing the target between each pulse may be carried out by any suitable means. For example, a scanner 126 may attached to laser 112 and may raster or otherwise adjust the targeting of the laser pulses to direct multiple laser pulses 30 across surface 102. Alternatively, or in addition, ablation laser 112 may be moved between each pulse to direct the series of laser pulses 30 along ablation path 122. Adjacent points 120 may overlap or be distinct as suited to the particular application. Scanner 126 may raster, or ablation laser 112 may be moved, along additional paths to ablate material throughout area 104. Each path of ablation may begin adjacent an edge 124 of first surface 102 or at any suitable location that is part of area 104 where material is desired to be ablated.

As best seen in FIGS. 6-9, the composite part may consist of multiple layers 202, 204, 206, and 208. FIGS. 6-9 are schematic and not to scale and are intended to show generally the relative location of the different layers of the part. Layers 202 generally represent the layers of fiber material, e.g., carbon fibers, and matrix material, e.g., epoxy resin, that typically make up the bulk of a composite part. Alternatively, the composite part may be formed from a three-dimensional arrangement of fibers infused with matrix material. Layer 204 is a layer of only matrix material, sometimes referred to as a resin cap. Layer 204 may be in part a result of a resin film applied to an outer surface of a composite part and/or a thin layer of resin-only that has formed on the surface during processing of the part. Layer 206 is a layer of UV-exposed matrix material that is sometimes present on a part made of composite material. Layer 208 is a layer of surface contaminants, for example mold release agents, which also are sometimes present on a part. Although these layers are represented as distinct layers in FIGS. 6-9, it will be understood they may be intermixed and difficult to distinguish in typical parts, and of varying thicknesses. In the embodiment depicted in FIGS. 6-9, transducer 162 is directly coupled to the surface 166 of part 90 opposite the surface 102 that is being ablated by the laser.

Figures 6, 7:
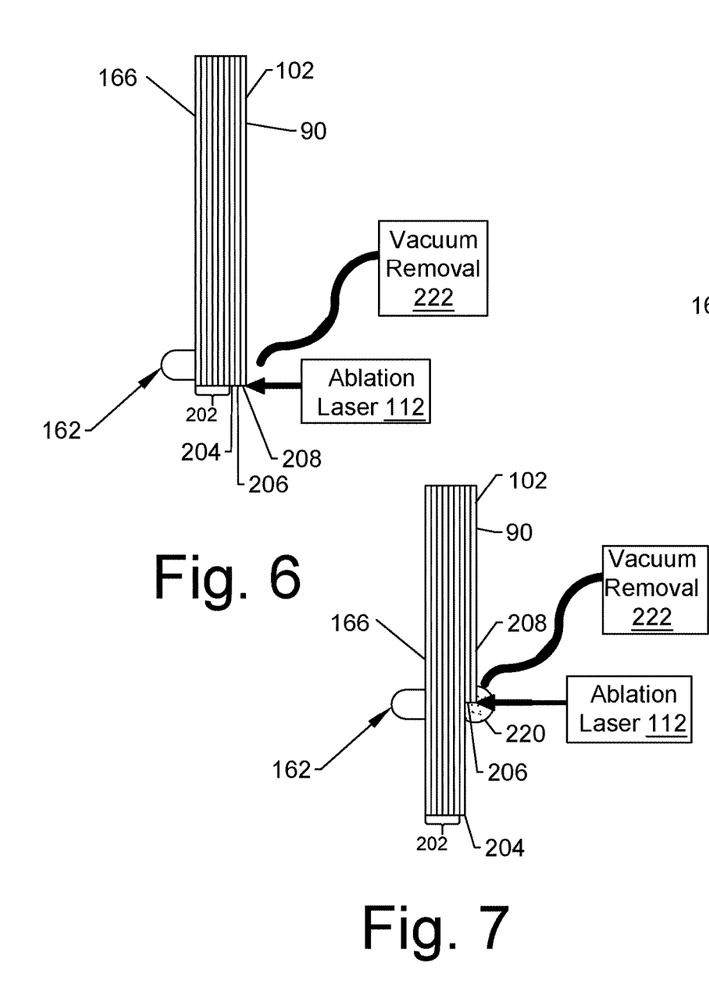
FIG. 6 is a block diagram of the ablation laser of any of the systems of FIGS. 1-5 showing the laser beam directed at the first surface of the part at the commencement of the ablation of material from the part, and also showing a mechanism for vacuum removal of material as it is vaporized by the ablation laser.
FIG. 7 is a block diagram of the ablation laser and part as in FIG. 6, showing the removal of a portion of material from the part, in this case an outermost portion of the part such as surface contaminants.
Figures 8, 9:
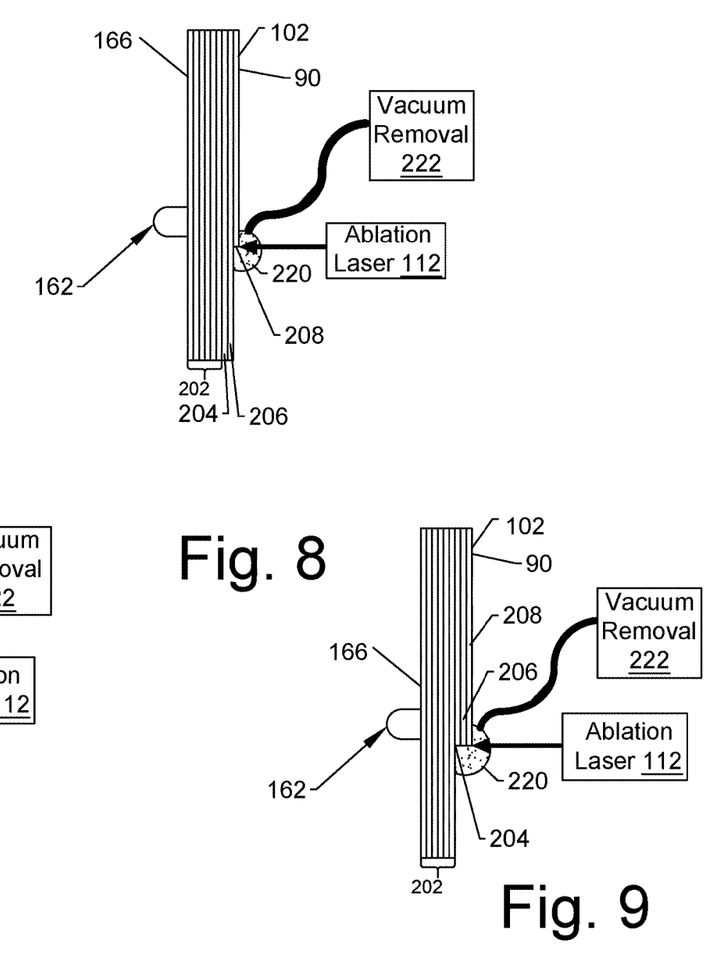
FIG. 8 is a block diagram similar to FIG. 7 showing the removal of surface contaminants and a layer of UV-exposed matrix material.
FIG. 9 is a block diagram similar to FIG. 8 showing the removal of a layer of matrix material along with the surface contaminants and UV-exposed matrix material.

Generally, the ablative process of the present disclosure will be tuned by selecting laser parameters to remove a portion of the part including at least any surface contaminants that are present on the part, as illustrated by FIG. 7. The removed portion may also include layer 206 of UV-exposed matrix material, as illustrated in FIG. 8. The removed portion may also include layer 204 of matrix-only material, as illustrated in FIG. 9, which generally corresponds to removing the portion down to the uppermost fiber layer within layers 202. The ablative process may produce a vapor or cloud of particles 220 of material adjacent the point of ablation, which may be removed by a vacuum removal tool 222 or other suitable means.

Typically, the removed portion includes only a portion of layer 204 without reaching the fibers in layer 202. Removal of a portion of layer 204 typically improves likelihood of sufficient removal of contaminants and UV residue material of layers 206 and 208. Alternatively, the removed portion may also include, in additional to layer 204, at least some of fiber layer 202, although generally it is expected that exposed fiber, e.g., carbon fiber, shields the underlying portion from exposure to laser radiation, so the laser typically does not penetrate beyond the outermost fiber layer. A typical depth of the removed portion for a composite material is in the range between about 3 microns and 9 microns, and more or less may be removed as suited to the particular processing step being accomplished.

A relative-positioning system 140 may include one or more components for moving the part and/or the laser ablation system relative to one another to carry out the ablation along one or more paths to complete ablation of area 104. A fixture 142 may be provided to hold the part for ablation and inspection. For example, as shown in FIGS. 1-5 a U-shaped fixture may clamp or otherwise hold the part along one or more of its sides giving the ablation laser access to area 104 of surface 102. Relative-positioning system 140 may include a position/attitude control system 144, which may be coupled to fixture 142, to move the part in position and/or attitude to allow laser beam 28 to reach all portions of surface 102 desired to be ablated. The part may be moved in attitude to adjust and/or maintain the angle of incidence of laser beam 28 on the surface of the part. Relative-positioning system 140 may additionally or alternatively include scanner 126 and/or a control system 146, which may be coupled to ablation laser 112, to re-target laser beam 28 by scanning and/or moving the laser in position and/or attitude. In any case, relative-positioning system 140 provides for adjusting the relative position of the part and the laser over a set of locations distributed across the area of the part, such as the path of ablation as shown in FIGS. 1-5. Relative-positioning system 140 may also provide for adjusting the relative attitude of the part and the laser, for example, to keep laser beam 28 at a fixed angle, e.g., normal, with respect to the surface of the part at the point of ablation, e.g., if the part surface is curved or if the laser is scanned from a single position across a broad area.

Figure 2:
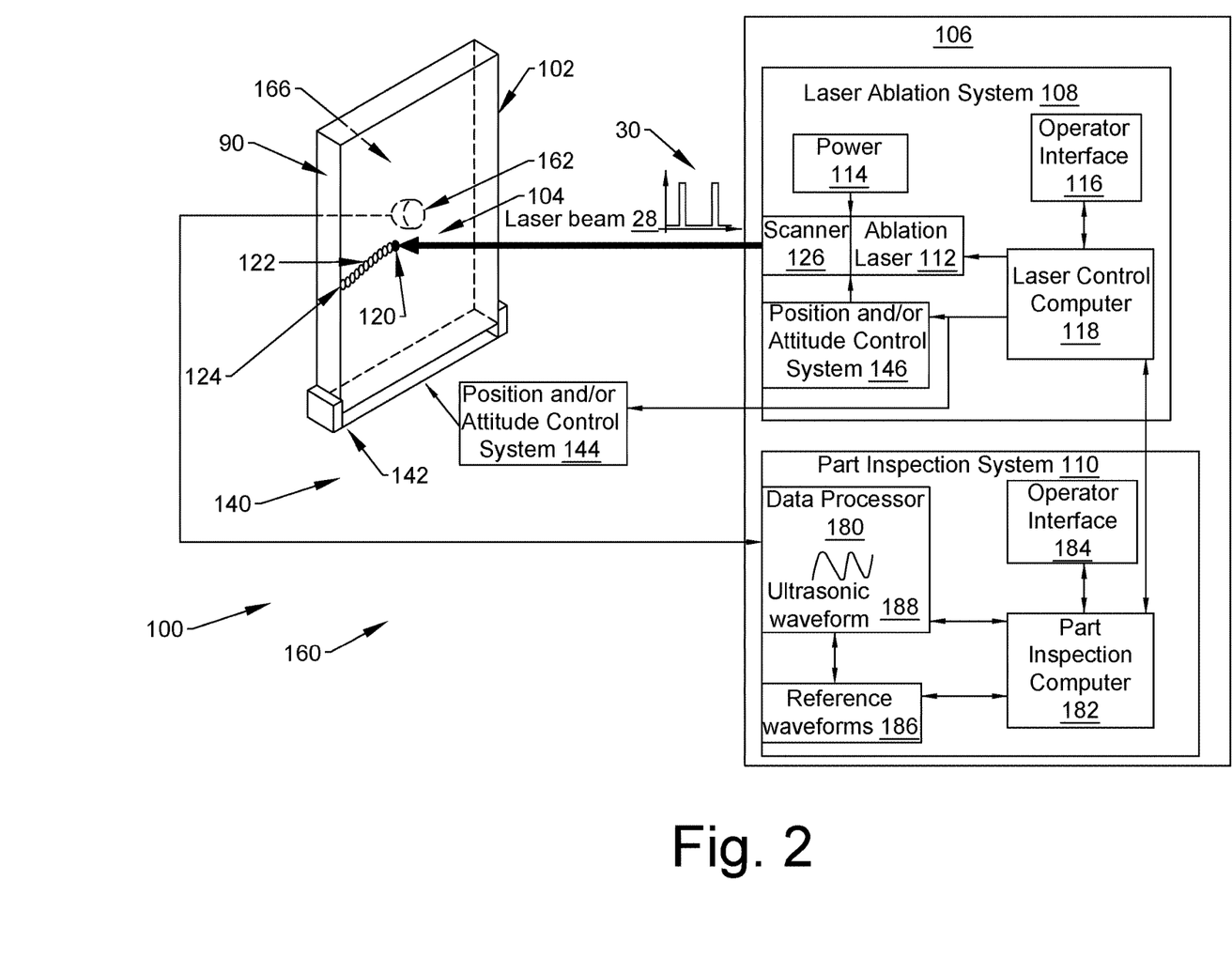
FIG. 2 is a block diagram of a system for laser ablation and part inspection operating on a part to remove material from a series of locations on an area of a first surface of the part and to receive ultrasound waveforms from the part for each location from a transducer located on a second surface of the part.
Figure 3:
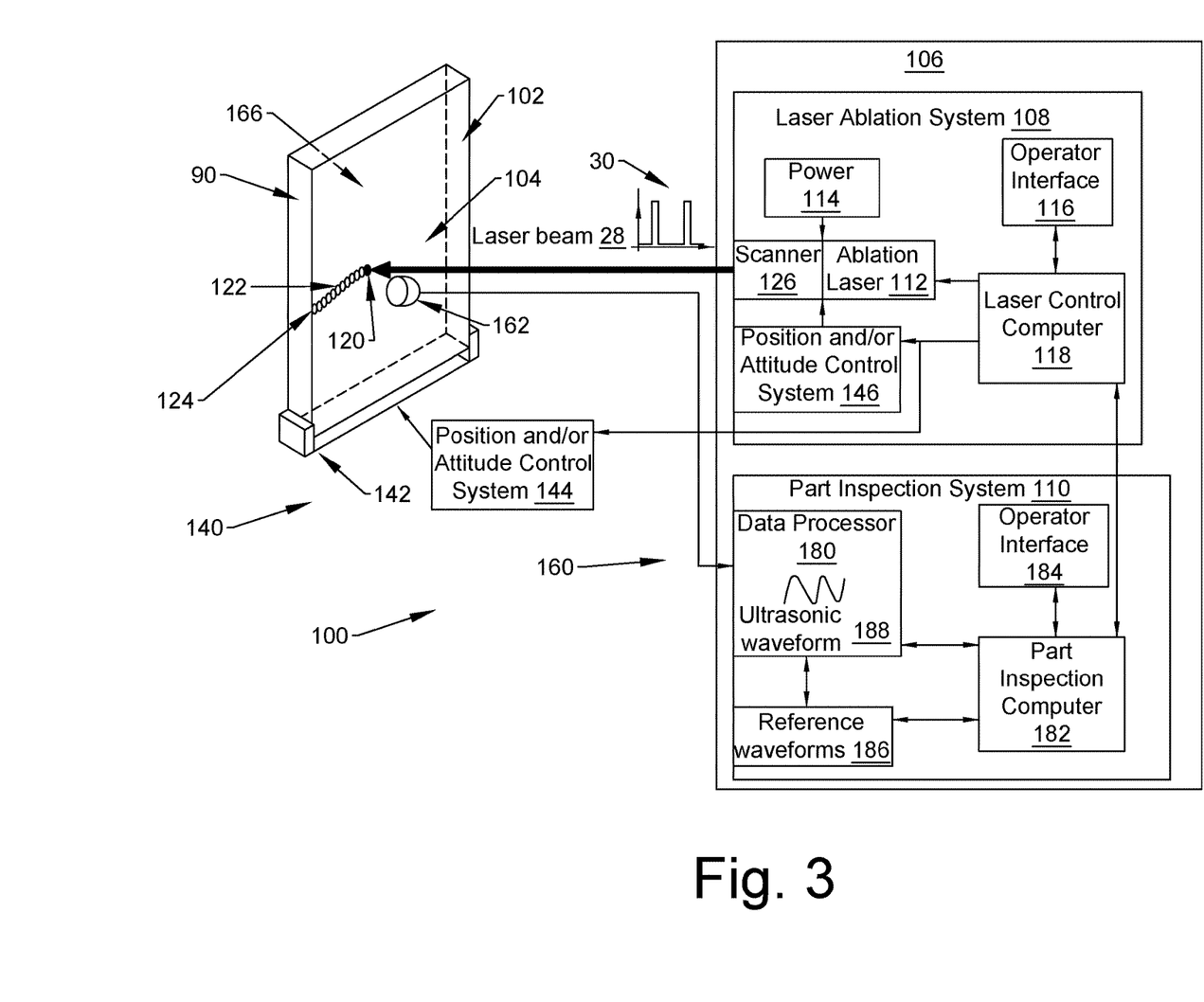
FIG. 3 is a block diagram of a system for laser ablation and part inspection as in FIG. 2 with the transducer located on the first surface of the part.

An ultrasound testing system 160 of combined system 100 may include part inspection system 110 and a transducer 162 that may be directly coupled to the part, as in FIGS. 1-3. Alternatively, transducer 162 may be a component of an ultrasonic detector 164 that is indirectly coupled to the part, as in FIGS. 4 and 5. In any case, transducer 162 is configured to detect the ultrasound waveform 188 produced by the part in response to each ablative laser pulse. Transducer 162 transmits each ultrasound waveform to a data processor 180 in part inspection system 110.

Generally, any transducer suitable to the particular processing and inspection being accomplished may be used. Any type of direct contact transducer, such as a piezoelectric transducer may be used. Any type of indirectly-coupled transducer may also be used, such as air-coupled or laser-coupled transducers, or electromagnetic acoustic transducers (EMAT), may be used. Generally, an EMAT may be used on a part if it includes a metal layer, e.g., a composite-material structure with an embedded metal layer for electromagnetic/lightning-strike protection. For example, if the part is a composite-material structure for a wing surface, and ablation is being applied to the inner mold line (IML), then the outer mold line (OML) will typically include an embedded metal layer, and an EMAT on the OML surface may detect the ultrasound waveform from the metal layer.

As shown in FIG. 2, transducer 162 may be coupled to the part by being in direct contact with a second surface 166 of the part where the ablative laser pulse is directed. For example, a piezoelectric transducer in contact with second surface 166 may be used.

As shown in FIG. 3, transducer 162 may be coupled to the part by being in direct contact with first surface 102 of the part where the ablative laser pulse is directed. The piezoelectric transducer as used for the FIG. 2 embodiment may also be used here.

Figure 4:
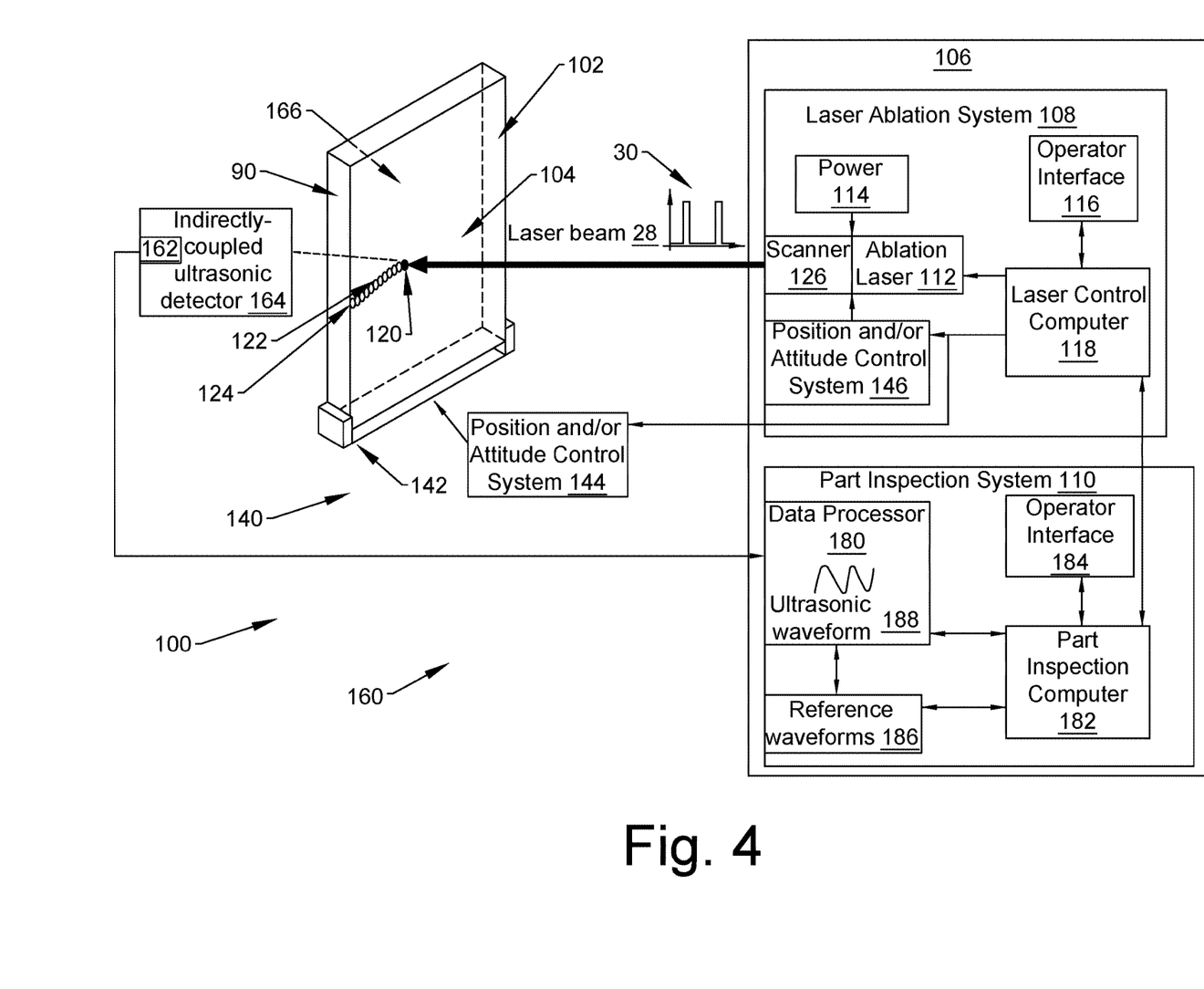
FIG. 4 is a block diagram of a system for laser ablation and part inspection as in FIG. 2 with the transducer located in an indirectly coupled ultrasonic detector aimed at the second surface of the part.

As shown in FIG. 4, ultrasonic detector 164 may be aimed at second surface 166 of the part, providing an indirect coupling of transducer 162 to the part at the surface where the ablative laser pulse is directed. For example, a laser-coupled or air-coupled transducer or an EMAT may be used in ultrasonic detector 164.

Figure 5:
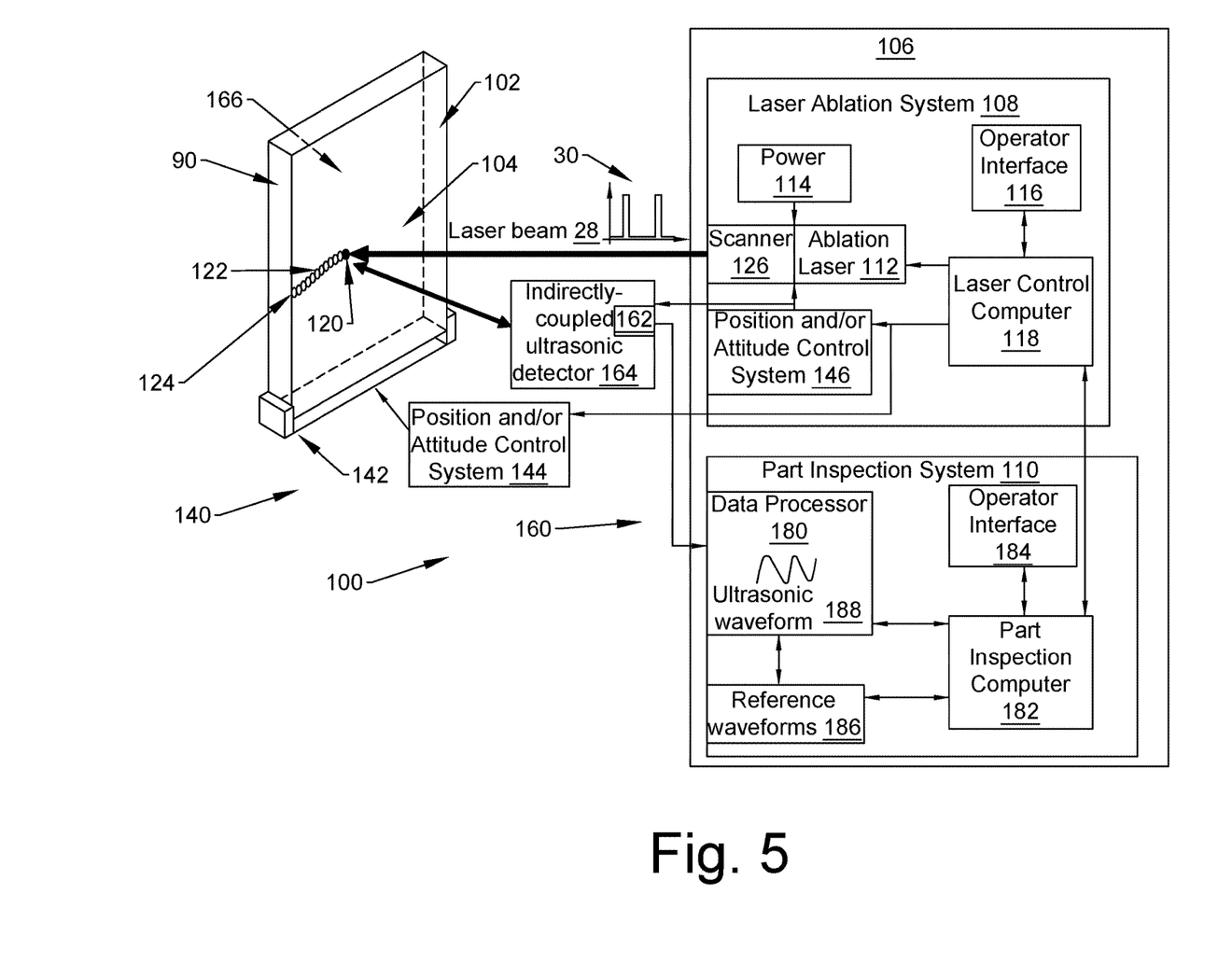
FIG. 5 is a block diagram of a system for laser ablation and part inspection as in FIG. 2 with the transducer located in an indirectly coupled ultrasonic detector aimed at the first surface of the part.

As shown in FIG. 5, ultrasonic detector 164 may be aimed at first surface 102 of the part, providing an indirect coupling of transducer 162 to the part at the surface where the ablative laser pulse is directed. For example, a laser-coupled or air-coupled transducer or an EMAT may be used in ultrasonic detector 164.

Transducer 162 may be fixed in position relative to laser ablation system 108. For example, with an indirectly-coupled transducer, as shown in FIGS. 4 and 5, movement of the ablation laser 112 relative to the part may also move transducer 162 relative to the part, keeping transducer 162 aimed at a fixed location relative to the point of ablation for uniform detection of the ultrasound produced by the ablative laser pulse. Alternatively, position/attitude control system 146 (see, e.g., FIG. 5) may also provide for moving ultrasonic detector 164 and transducer 162 relative to the part.

A processor, such as data processor 180 in part inspection system 110 receives each ultrasound waveform 188 from transducer 162. Part inspection system 110 may include a computer 182 configured to handle operations that may include the storage, categorization, recall, and/or comparison of the ultrasound waveforms. Part inspection computer 182 may be controlled via an operator interface 184 and/or under automated control for carrying out operations relating to the ultrasound waveforms received from a part under test and/or a reference part. As shown in FIGS. 1-5, laser control computer 118 and part inspection computer 182 may be in communication with one another and/or may be implemented as software in a single control computer for carrying out the combined ablation and inspection of multiple parts of the same material and configuration and/or combined ablation and inspection of different sets of multiple parts of various material and configuration.

For example, operations for a reference part of one material and configuration may include part inspection system 110 storing one or more baseline waveforms in a database or other storage configuration of reference waveforms 186. Reference part 20 may be a part known to be a conforming part, i.e., an acceptable part under the applicable standard and/or specification, or a defective part or part known to include anomalies, i.e., an unacceptable part under the applicable standard and/or specification, e.g., one with an inserted anomaly. Each of the baseline waveforms may be appropriately categorized under such testing. A similar development of sets of baseline waveforms may be carried out for parts of different materials and configurations. Development of baseline waveforms may be carried out on a reference part using the same ablative pulse as applied to the parts under test and/or may use a different pulse of different parameters as best suited to the particular type of material and part being prepared and inspected.

Generally, the comparison of ultrasound waveforms in parts under test to reference waveforms in embodiments of the present disclosure are carried out in a manner similar to existing nondestructive inspection techniques, which typically use a range of waveforms. For example, the nondestructive inspection for a wing has multiple standard reference waveforms that encompass the range of geometry present. For embodiments of the present disclosure, sets of reference waveforms under ablative ultrasound generation may be developed.

For a part under test, part inspection system 110 may compare each ultrasound waveform from a point of ablation to one or more of the baseline waveforms. If the ultrasound waveforms from a part under test are within an acceptable range of conformity with baseline waveforms from a known conforming reference part, then part inspection system 110 may record and/or identify the part under test as non-anomalous. Conversely, if ultrasound waveforms from a part under test conform within an established range to one or more baseline waveforms from a known defective reference part, i.e., a part with one or more known anomalies, then part inspection system 110 may record and/or identify the part under test as anomalous. Additionally, a correspondence of an ultrasound waveform from a part under test with a known-defective reference, e.g., one due to particular known anomaly, may provide information about the type and extent of the anomaly, e.g., reference waveforms from unacceptable and acceptable parts may provide signal levels or features that correlate to defect type and/or size.

Ablation and part inspection in accordance with embodiments of the present disclosure may be carried out using only known-conforming baseline waveforms, only known-defective baseline waveforms, or a combination of both. Thus, system 100 is configured to combine ablation of area 104 of surface 102 of a part with inspection of the structural integrity of the part.

As described herein, system 100 may combine the preparing of surface 102 of a composite structure such as part under test 90 with the inspecting of an internal integrity of the structure. System 100 may include fixture 142 for holding the composite structure and laser ablation system 108 for directing an ablative laser pulse at the surface of the part sufficient to remove a portion of composite material and/or contaminants or residue from the surface of the part and to cause the part to produce an ultrasound waveform. System 100 may further include positioning system 140 coupled to either or both of laser ablation system 108 and fixture 142 for positioning of the composite structure relative to laser ablation system 108. System 100 may further include ultrasonic detection device 164, which may include transducer 162, for coupling to the composite structure to receive the ultrasound waveform. System 100 may also include a control computer, e.g., part inspection computer 182 and/or laser control computer 118, controlling laser ablation system 108, positioning system 140, and ultrasonic detection device 164 for directing a series of ablative laser pulses 30 at a series of locations over the surface of the structure, such as multiple paths of ablation 122. The control computer may receive the ultrasound waveform from the structure after each pulse, resulting in the control computer receiving a set of ultrasound waveforms. The control computer may also include a baseline waveform, e.g., those stored in reference waveforms 186, that the control computer compares to the set of ultrasound waveforms. The control computer may identify any locations on the structure where the ultrasound waveform is anomalous as compared to the baseline waveform. The control computer may also include plural baseline waveforms including at least one baseline waveform representative of a known conforming part and at least one baseline waveform representative of a known defective part with known anomalies. With plural baseline waveforms, the control computer may compare the baseline waveform representative of the known conforming part to the set of ultrasound waveforms, and may also compare the baseline waveform representative of a known defective part to at least a portion of the set of ultrasound waveforms. The control computer may use such comparing to determine if the composite structure contains any anomalies.

One or more embodiments according to the present disclosure may also provide for a method that combines the preparation of area 104 of surface 102 of a part, e.g., one formed of a composite material, with the inspection of the part for structural integrity. Such method may include a step of positioning the part relative to the laser at a location in area 104 of the part. Such method may also include a step of directing an ablative laser pulse at surface 102 of the part sufficient to remove a portion of the composite material and/or contaminants or residue from surface 102 of the part and to cause the part to produce an ultrasound waveform. Such method may also include steps of receiving in an ultrasound testing system, such as part inspection system 110, the ultrasound waveform caused by the pulse and comparing the ultrasound waveform at the location to one or more baseline waveforms. Such method may further include steps of repeating, at a set of locations distributed across area 104 of the part, the steps of positioning the part relative to the laser, directing the pulse, receiving the ultrasound waveform, and comparing the ultrasound waveform.

Generally, the system will carry out the step of receiving the ultrasound waveform after each application of the ablative laser pulse. Alternatively, the system may carry out the step of receiving the ultrasound waveform after only a subset of ablative laser pulses 30. Similarly, the system will typically carry out the step of comparing each ultrasound waveform to one or more baseline waveforms. Alternatively, the system may compare only a subset of the ultrasound waveforms with one or more baseline waveforms. In each of these cases, a size and distribution of the steps in such subsets may be determined as best suited for the particular part and processing of the part being undertaken.

Figure 10:
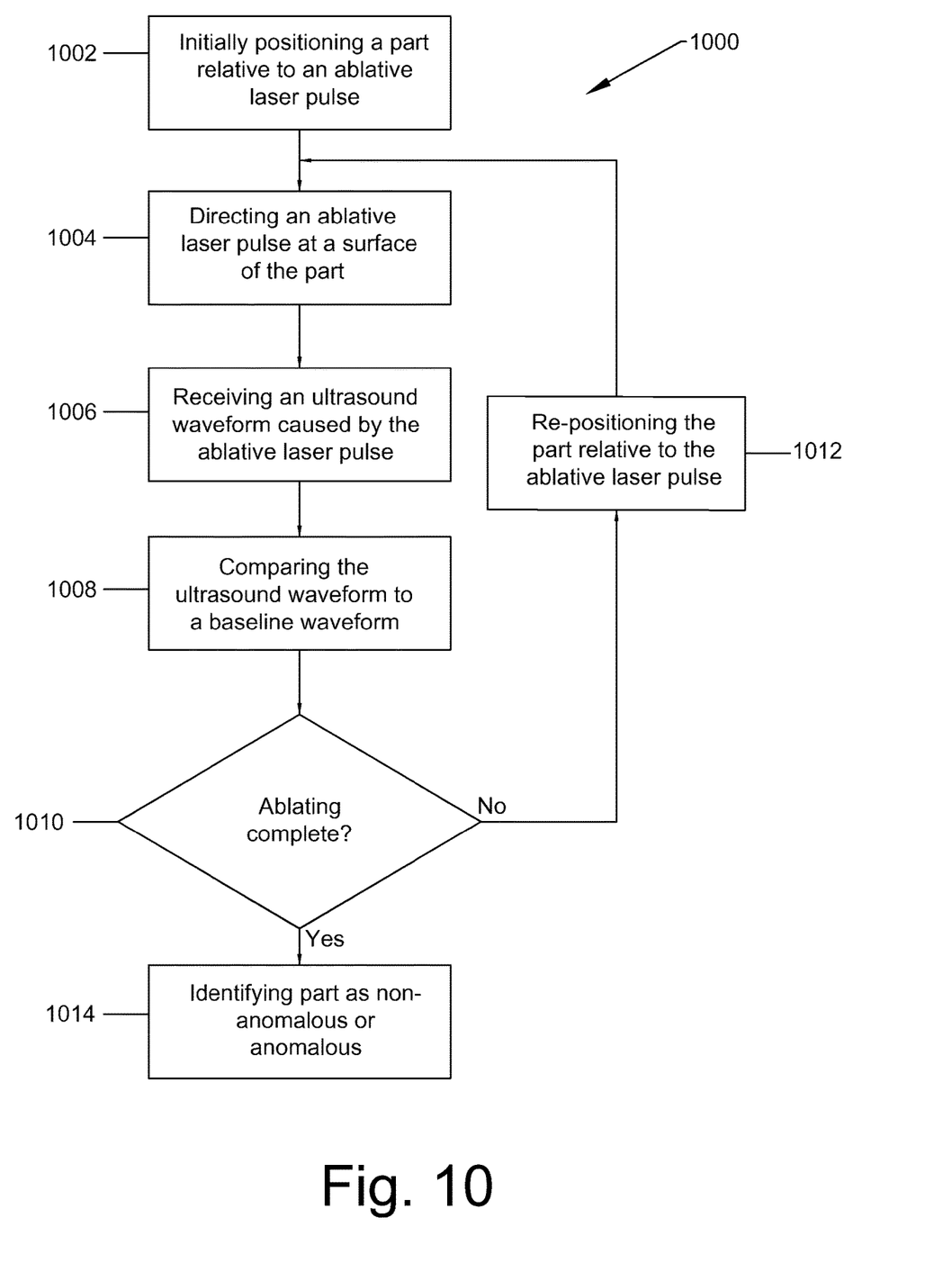
FIG. 10 is a block diagram showing a method for processing parts with a laser ablation and part inspection system.

An example method of operation 1000 of one or more embodiments of the present disclosure is depicted in FIG. 10, which is a block diagram showing a set of steps for processing parts with a laser ablation and part inspection system. In method 1000, ablation and inspection system 106 may be set up initially by positioning a part relative to an ablative laser pulse as shown in step 1002. Then, an ablative laser pulse may be directed at a surface of the part as shown in step 1004. The ablative laser pulse causes an ultrasound waveform that may be received in the part inspection system and compared to a baseline waveform as shown in steps 1006 and 1008. The system may then decide whether the ablating process is complete or to continue ablating as shown in step 1010. If ablation is not complete, then the system may relatively re-position the part and the laser ablative pulse, as shown in step 1012, and then return to the ablative process at step 1004. When ablation is complete, the part may be identified as non-anomalous or anomalous as shown in step 1014.

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

We claim:

1. A system for preparing an area of a surface of a part formed of a composite material and for inspecting a structural integrity of the part, the system comprising:
 a. a laser ablation system for directing a single ablative laser pulse at the surface of the part to ablate a selected portion of the composite material adjacent to the surface of the part to form an ablated portion and to cause the part to produce an ultrasound waveform in response to the single ablative laser pulse;
 b. a portion removal system coupled to the part, wherein the portion removal system removes the ablated portion;
 c. a relative-positioning system coupled to one or both of the part and the laser ablation system, wherein the relative-positioning system provides for adjusting a relative position of the part and the ablative laser pulse over a set of locations distributed across the area of the part;
 d. an ultrasound testing system including a transducer to detect the ultrasound waveform produced by the part in response to the single ablative laser pulse; and
 e. a processor for receiving the ultrasound waveform and comparing the ultrasound waveform at one or more locations in the set of locations to a baseline waveform, for providing information about an extent of ablation of the composite part.

2. The system of claim 1, further wherein the transducer is fixed in position relative to the laser ablation system.

3. The system of claim 1, wherein the ultrasound testing system further includes a positioning system for moving the transducer relative to the part.

4. The system of claim 1, wherein the relative-positioning system further includes an attitude control mechanism for adjusting an attitude of the laser ablation system relative to the part.

5. The system of claim 1, wherein the transducer is coupled to the surface of the part where the ablative laser pulse is directed.

6. The system of claim 1, wherein the transducer is coupled to a second surface of the part, the second surface located opposite the surface where the ablative laser pulse is directed.

7. The system of claim 1, wherein the portion ablated from the surface of the part is between about 3 microns and about 9 microns in depth.

8. The system of claim 1, wherein the portion ablated from the surface of the part is at least about 3 microns in depth.

9. The system of claim 1, wherein the composite material of the part includes multiple layers of a fiber material embedded in a matrix material, and the single ablative laser pulse is configured to ablate a portion of the matrix material.

10. The system of claim 1, wherein the composite material of the part includes multiple layers of a fiber material embedded in a matrix material, and the single ablative laser pulse is configured to ablate the matrix material down to the fiber material.

11. A system for combined preparation of a surface of a composite structure and inspection for an internal integrity of the composite structure, the system comprising:
 a. a fixture for holding the composite structure;
 b. a laser ablation system for directing a single ablative laser pulse at a target on the surface of the composite structure, configured to cause an ablation of a portion of composite material around the target, from the surface of the composite structure and to cause the composite structure to produce an ultrasound waveform in response to the single ablative laser pulse and ablation of the portion of composite material;
 c. a positioning system coupled to at least one of the laser ablation system and the fixture for positioning of the composite structure relative to the laser ablation system;

d. an ultrasonic detection device for coupling to the composite structure to receive the ultrasound waveform produced by the single ablative laser pulse; and e. a control computer coupled to the laser ablation system, the positioning system, and the ultrasonic detection device for directing a series of ablative laser pulses at a series of locations over the surface of the composite structure and receiving the ultrasound waveform from the composite structure after each ablative laser pulse, the control computer receiving a set of ultrasound waveforms, for providing information about an extent of ablation of the composite part.

12. The system of claim 11 wherein the control computer includes a baseline waveform that the control computer compares to the set of ultrasound waveforms.

13. The system of claim 12 further wherein the control computer identifies any locations on the composite structure where the ultrasound waveform is anomalous as compared to the baseline waveform.

14. The system of claim 11 wherein the control computer includes plural baseline waveforms including at least one baseline waveform representative of a known conforming part and at least one baseline waveform representative of a known defective part, wherein the control computer compares the baseline waveform representative of a known conforming part to the set of ultrasound waveforms, and wherein the control computer compares the baseline waveform representative of a known defective part to at least a portion of the set of ultrasound waveforms.

15. A method for preparing an area of a surface of a part formed of a composite material and for inspecting a structural integrity of the part, the method comprising the steps of:

a. providing a laser ablation system for directing a single ablative laser pulse at the surface of the part, configured to ablate a portion of the composite material from the surface of the part and to cause the part to produce an ultrasound waveform in response to the single ablative laser pulse;

b. providing a system for relative positioning of the part and the ablative laser pulse;

c. providing an ultrasound testing system including a transducer to detect the ultrasound waveform produced by the part;

d. positioning the part relative to the ablative laser pulse at a location in the area of the part;

e. directing the ablative laser pulse at the location in the area of the part;

f. ablating the portion of the surface of the part to form an ablated portion of the composite material;

g. removing the ablated portion of the composite material from the surface of the part by a portion removal system;

h. receiving in the ultrasound testing system the ultrasound waveform caused by the single ablative laser pulse;

i. comparing the ultrasound waveform at the location to a baseline waveform; and j. repeating, at a set of locations distributed across the area of the part, the steps of positioning the part relative to the ablative laser pulse, directing the ablative laser pulse, receiving the ultrasound waveform, and comparing the ultrasound waveform, for providing information about an extent of ablation of the composite part.

16. The method of claim 15 further wherein the step of comparing the ultrasound waveform to the baseline waveform is carried out by the ultrasound testing system.

17. The method of claim 15 further wherein the step of positioning the part relative to the ablative laser pulse is carried out by moving the part.

18. The method of claim 15 further wherein the step of positioning the part relative to the ablative laser pulse is carried out by changing a targeting of the ablative laser pulse.

19. The method of claim 15 further wherein the steps of receiving the ultrasound waveform and comparing the ultrasound waveform are performed for substantially all of the ablative laser pulses.

20. The method of claim 15 further wherein the steps of receiving the ultrasound waveform and comparing the ultrasound waveform are performed only for a subset of the ablative laser pulses.

* * * * *